(12) United States Patent
Ji et al.

(10) Patent No.: US 6,553,686 B2
(45) Date of Patent: Apr. 29, 2003

(54) GRAIN ROASTING APPARATUS

(75) Inventors: Yong Ji, Inchon-si (KR); Sang-Joon Yoon, Seoul (KR)

(73) Assignee: Innotech Co., Ltd. (KR)

( * ) Notice: Subject to any disclaimer, the term of this patent is extended or adjusted under 35 U.S.C. 154(b) by 0 days.

(21) Appl. No.: 09/972,486

(22) Filed: Oct. 6, 2001

(65) Prior Publication Data
US 2003/0009900 A1 Jan. 16, 2003

(30) Foreign Application Priority Data
Jul. 11, 2001 (KR) ............................................ 01-41546

(51) Int. Cl.[7] ................................................. F26B 19/00
(52) U.S. Cl. ............................ 34/68; 34/223; 34/134; 34/219; 426/629; 426/466; 426/467
(58) Field of Search ............................... 34/58, 68, 132, 34/134, 135, 136, 137, 223, 184, 187, 219, 586, 593, 594; 426/233, 638, 629, 465, 466, 467; 99/443; 110/226

(56) References Cited

U.S. PATENT DOCUMENTS

| | | | | |
|---|---|---|---|---|
| 4,271,603 A | * | 6/1981 | Moore, III | .................. 34/181 |
| 4,860,461 A | * | 8/1989 | Tamaki et al. | .................. 34/68 |
| 5,273,355 A | * | 12/1993 | May et al. | .................... 366/23 |
| 5,638,607 A | * | 6/1997 | Lemme et al. | ................ 34/136 |
| 5,996,245 A | * | 12/1999 | Yamato | ........................ 34/138 |
| 6,195,912 B1 | * | 3/2001 | Moon et al. | ................... 34/577 |

* cited by examiner

Primary Examiner—Ira S. Lazarus
Assistant Examiner—Kathryn S. O'Malley
(74) Attorney, Agent, or Firm—R. Neil Sudol; William J. Sapone; Henry D. Coleman

(57) ABSTRACT

The present invention relates to a grain roasting apparatus in which a blower is installed at one side of a body having a support at a lower portion of the same, a heated air flow path is installed in the blower, a heater is provided, a peel collecting port and a discharge port are installed at the other side of the body, rotation portions are installed in an upper portion of the heated air flow path and an upper portion of the discharging port, respectively, a rotary drum is installed in the rotation portions, rotation members are rotated together with the rotary drum, the rotary drum is inserted into the rotation members, the rotary is installed eccentrically about a rotation center, support portions are installed opposite each other at both ends of the same, a heated air flow port having a net and connected with the heated air flow path is protruded from one side of the support, the heated air inlet is inserted into an insertion portion of the rotary port, respectively, and is supported therein, a ring gear is installed in an outer portion of the rotation member, and the ring gear is engaged with a worm gear of the driving motor installed in a lower portion of the body for thereby roasting the grains of coffee and grains in a state that the rotary drum is in a twisting state.

3 Claims, 6 Drawing Sheets

[FIG. 1]
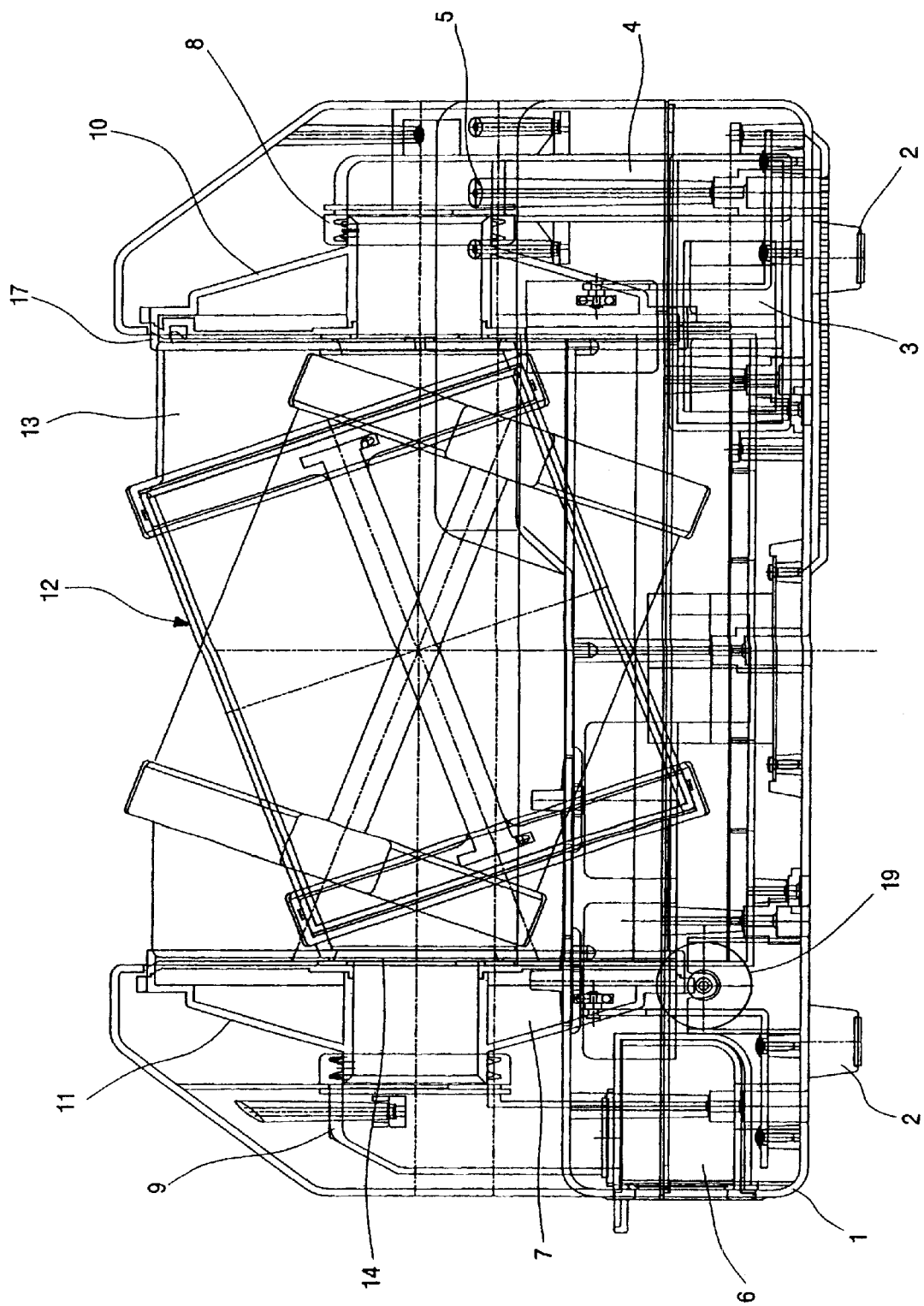

[FIG. 2]
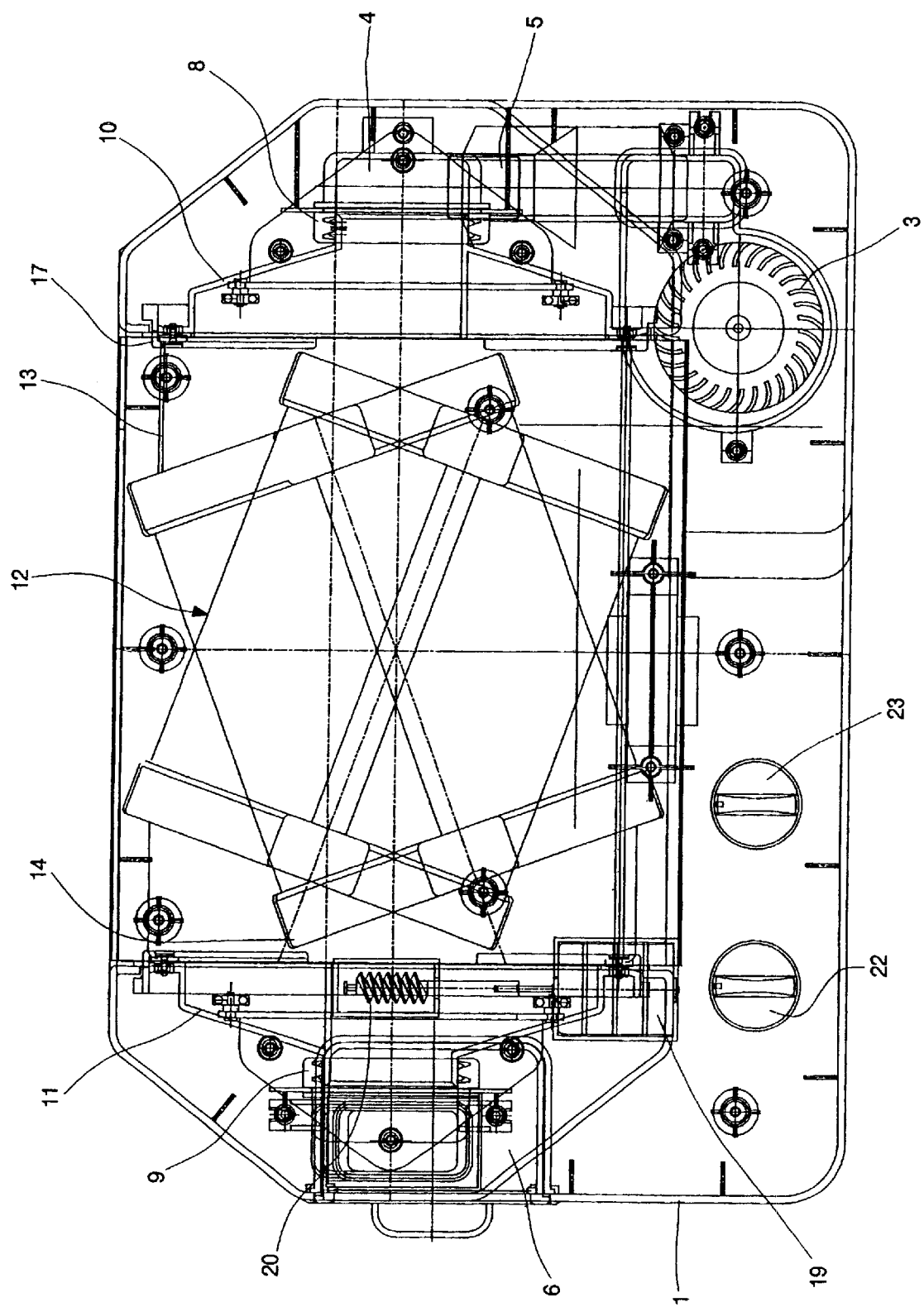

[FIG. 3]
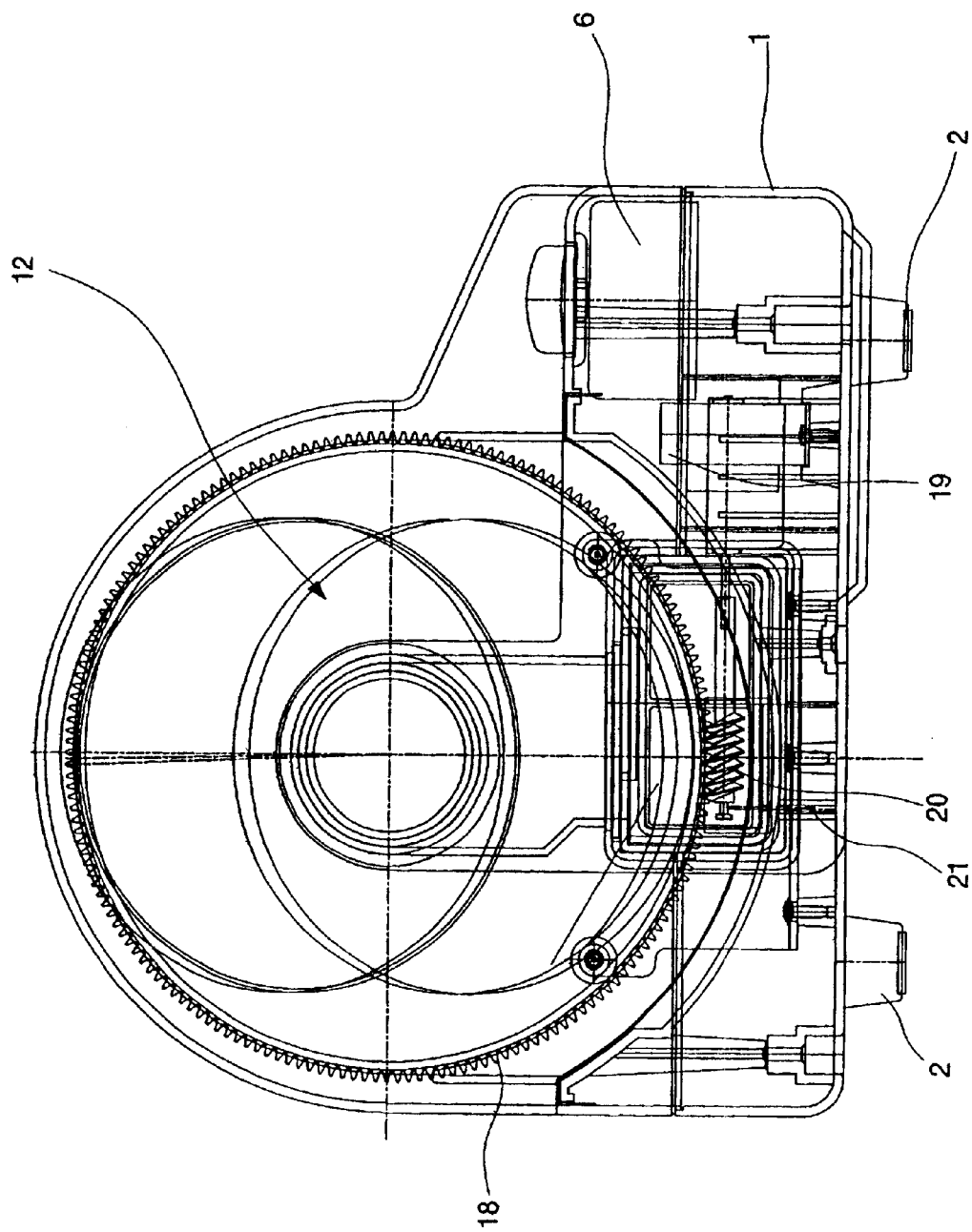

[FIG. 4]
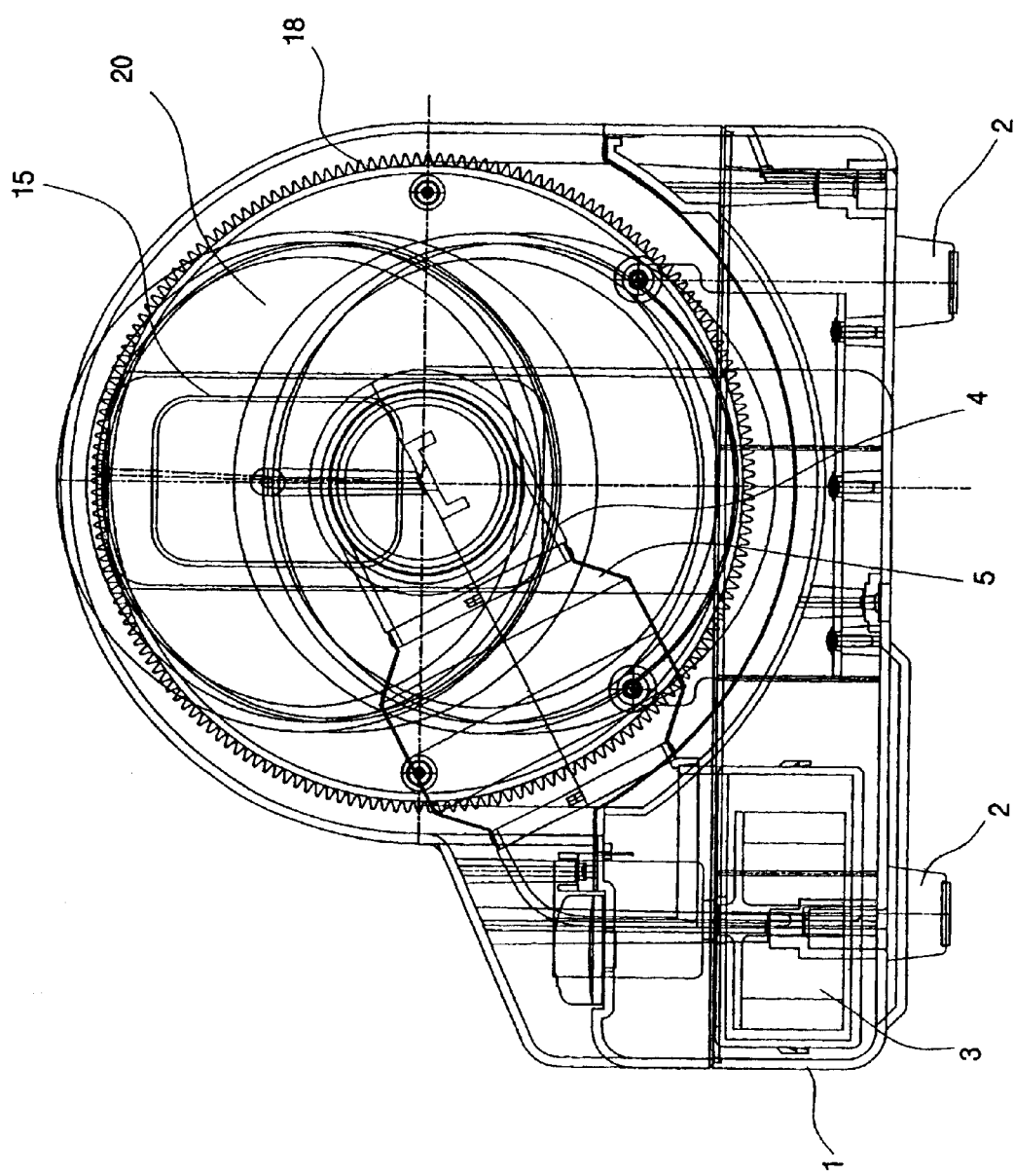

[FIG. 5]
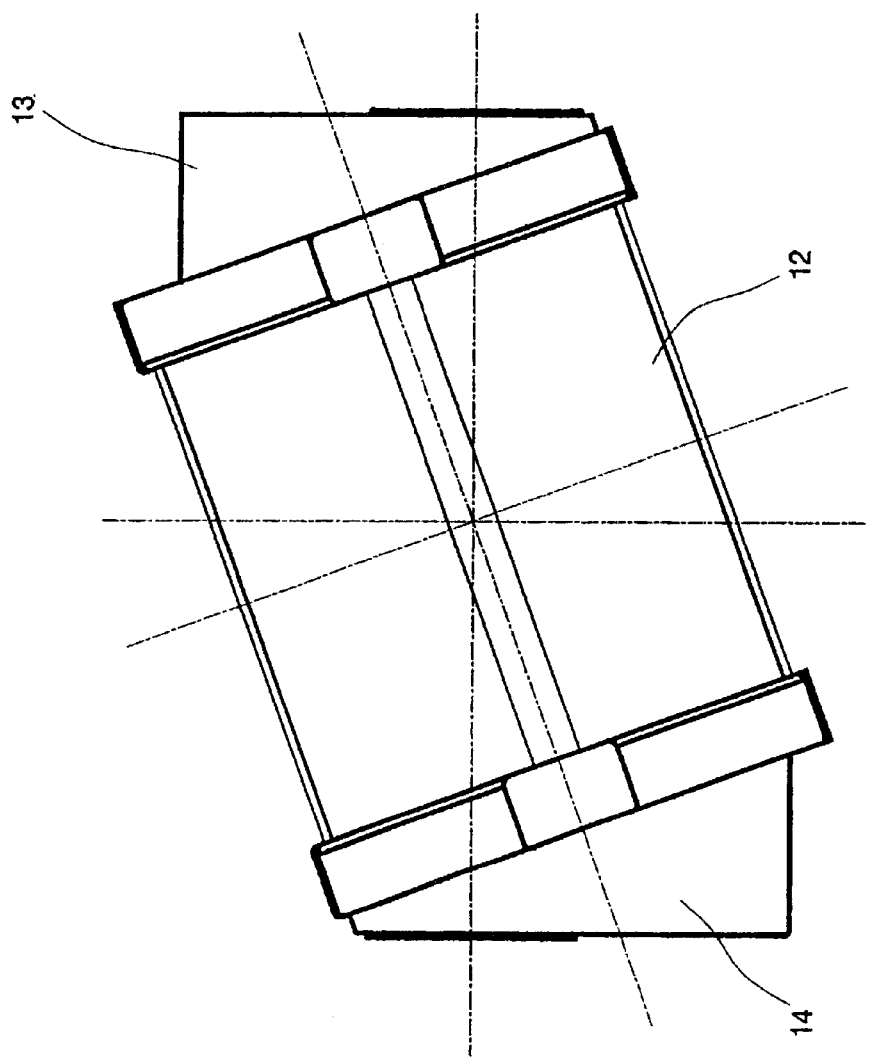

[FIG. 6]
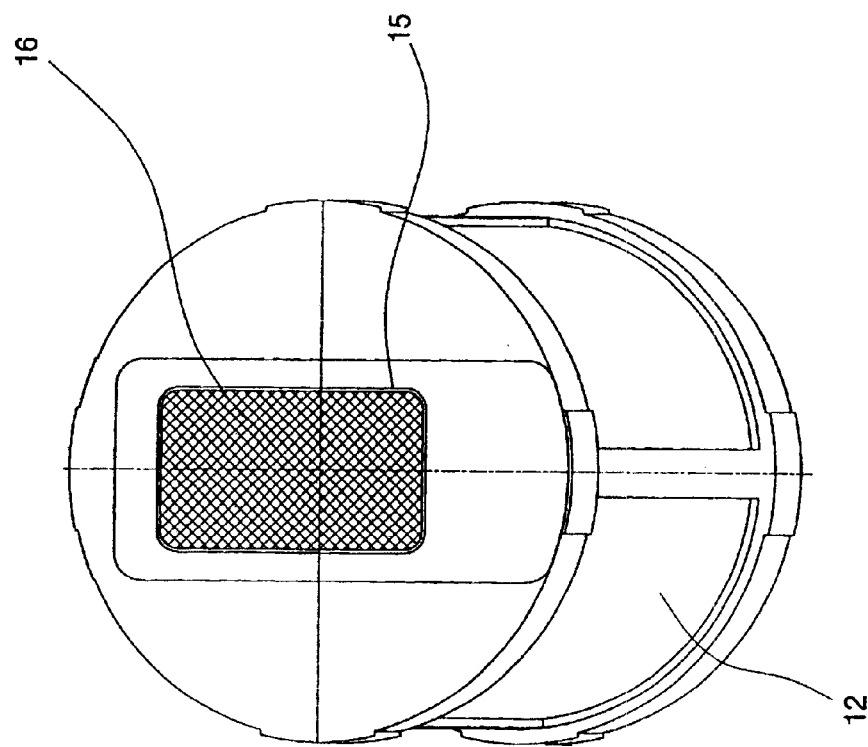

GRAIN ROASTING APPARATUS

BACKGROUND OF THE INVENTION

1. Field of the Invention

The present invention relates to a grain roasting apparatus, and in particular to a grain roasting apparatus which is capable of rotating a rotary drum in a twisting state in a state that a grain of coffee or grains are provided in a rotary drum, roasting the grain of coffee and grains based on a heated air, discharging the peels of the grain of the coffee and grains to the outside of the rotary drum during the roasting operation for thereby preventing the peels from being discharged to other area, controlling a roasting temperature of the grain of the coffee or the grains, so that it is possible to roast various kinds of grains at a proper temperature.

2. Description of the Background Art

Generally, when roasting a grain of coffee or grains such as sesame, rice, bean, etc., the grains are roasted at a certain temperature without destroying a nutrition component. In the case that the amount of the roasting grains is small, the grains are provided into a heating container and is agitated for implementing a proper roasting of the grains.

In the case of the grain of the coffee, it is important to roast the grain of the coffee at a certain temperature because the smell and perfumes of the coffee is largely changed based on the roasting state.

When roasting the grain of the coffee or the grains, the gain of the coffee or the grains are roasted manually. Therefore, the amount of the grain of the coffee or the grains which is roasted at one time is small. In addition, when roasting the grains of the coffee or the grains, the grains of the coffee or the grains must be repeatedly agitated. Furthermore, the roasting state is manually checked by bare eyes, and the roasting temperature is manually controlled. Therefore, it is very inconvenient for roasting the grains of the coffee and the grains.

When the roasting is completed, the heating container is held by hands and is moved to a certain place for pouring the roasted grains. Therefore, the user may be heat-damaged when handling the heated container.

In order to prevent the above-described problems, a roasting apparatus capable of automatically roasting the grains is introduced. However, since the above-described roasting apparatus has a big volume and is designed to roast the grains at a certain temperature. The roasted grains are discharged to the outside based on the rotation of the heating container. Therefore, it is impossible to implement a proper roasting temperature based on the kinds of the grains. Namely, in the conventional roasting apparatus, only one kind of grain is roasted in one heating container. Since the volume of the heating container becomes larger proportionally to the amount of the grains in order to prevent the grains from being discharged to the other places, it is impossible to roast the grains at different temperatures and to obtain a certain taste and perfume based on the roasting degree of the grains.

SUMMARY OF THE INVENTION

Accordingly, it is an object of the present invention to provide a grain roasting apparatus which overcomes the problems encountered in the conventional art.

It is another object of the present invention to provide a grain roasting apparatus which is capable of rotating a rotary drum in a twisting state in a state that a grain of coffee or grains are provided in a rotary drum, roasting the grain of coffee and grains based on a heated air, discharging the peels of the grain of the coffee and grains to the outside of the rotary drum during the roasting operation for thereby preventing the peels from being discharged to other area, controlling a roasting temperature of the grain of the coffee or the grains, so that it is possible to roast various kinds of grains at a proper temperature.

To achieve the above objects, there is provided a grain roasting apparatus in which a blower is installed at one side of a body having a support at a lower portion of the same, a heated air flow path is installed in the blower, a heater is provided, a peel collecting port and a discharge port are installed at the other side of the body, rotation portions are installed in an upper portion of the heated air flow path and an upper portion of the discharging port, respectively, a rotary drum is installed in the rotation portions, rotation members are rotated together with the rotary drum, the rotary drum is inserted into the rotation members, the rotary is installed eccentrically about a rotation center, support portions are installed opposite each other at both ends of the same, a heated air flow port having a net and connected with the heated air flow path is protruded from one side of the support, the heated air inlet is inserted into an insertion portion of the rotary port, respectively, and is supported therein, a ring gear is installed in an outer portion of the rotation member, and the ring gear is engaged with a worm gear of the driving motor installed in a lower portion of the body for thereby roasting the grains of coffee and grains in a state that the rotary drum is in a twisting state.

BRIEF DESCRIPTION OF THE DRAWINGS

The present invention will become better understood with reference to the accompanying drawings which are given only by way of illustration and thus are not limitative of the present invention, wherein;

FIG. 1 is a front view illustrating the construction of a grain roasting apparatus according to the present invention;

FIG. 2 is a plan view illustrating the construction of a grain roasting apparatus according to the present invention;

FIG. 3 is a side view illustrating a construction of a grain roasting apparatus according to the present invention;

FIG. 4 is a side view illustrating other side of a grain roasting apparatus according to the present invention;

FIG. 5 is a front view illustrating a rotary drum according to the present invention; and FIG. 6 is a side view illustrating a rotary drum according to the present invention.

DETAILED DESCRIPTION OF THE PREFERRED EMBODIMENTS

The present invention will be explained with reference to the accompanying drawings.

A blower 3 is installed at one side of a body 1 having a support 2 at a lower portion thereof. A heated air flow path 4 is installed in the blower 3. A peel collecting port 6 and a peel discharging port 7 are installed at another side of the body 1. Rotation portions 8 and 9 are installed in an upper portion of the heated air flow path 4 and an upper portion of the peel discharging port 7. A rotary drum 12 is installed in the rotation portions 8 and 9, respectively. The rotation portions 8 and 9 include rotation members 10 and 11. The rotation members 10 and 11 are rotated in a state that the rotary drum 12 is inserted.

The rotation drum 12 installed in the rotation members 10 and 11 is installed eccentrically to the rotation center in such a manner that the supports 13 and 14 are opposite to each other at both ends of the same. A heated air inlet 15 having a net portion 16 is protruded at one side of the support 13 and is connected with the heated air flow path 4. The heated air flow port 15 is inserted into an insertion portion 17 of the rotation member 10 and is supported therein. A ring gear 18 is installed in an outer portion of the rotation member 11 and is engaged with a worm gear 20 of a driving motor 19. A clutch elastic unit 21 is installed at an end of the worm gear 20 for thereby controlling the rotation of the ring gear 18, so that the grains of coffee or grains are agitated and roasted in a state that the rotary drum 12 is in a twisting state.

A temperature controller 22 and a revolution controller 23 are installed in the heater and the driving motor, respectively, and are controlled by a controller installed in the control unit, so that it is possible to control a roasting state of the grain of coffee or grains in the rotary drum 12.

The operation of the present invention will be explained with reference to the accompanying drawings.

The heated air flow path 4 having the blower 3 and the heater 5 is installed at one side of the body 1 having the support 2 at a lower portion of the same, and the peel collecting port 6 and the discharging port 7 are installed at the other side of the same. The rotation portions 8 and 9 are installed in an upper portion of the heated air flow path 4 and an upper portion of the discharging port 7, respectively. The rotary drum 12 is installed in the rotation portions 8 and 9, respectively, and the rotation members 10 and 11 are rotated. The rotation drum 12 is inserted into the rotation members 10 and 11 and is rotated. The rotation members 10 and 11 are rotated about the center shaft of the rotary drum 12.

In the above state, the rotary drum 12 which is installed in the rotation members 10 and 11 is installed eccentrically with respect to the rotation center, and the supports 13 and 14 are installed opposite to each other at both ends of the same. The heated air inlet 15 having the net 16 is protruded from one side of the support 13 and is connected with the heated air flow path 4. The heated air inlet 15 is inserted into the insertion portion 17 of the rotation member 10 and is supported therein.

A ring gear 18 is installed in an outer portion of the rotation member 11 and is engaged with the worm gear 20 of the driving motor 19 installed at a lower portion of the body 1. The clutch elastic unit 21 is installed at an end portion of the worm gear 20 for thereby controlling the rotation of the ring gear 18, and the rotary drum 12 is rotated in a twisting state. The temperature controller 22 and the revolution controller 23 are installed in the heater and the driving motor, respectively. Therefore, the temperature and revolution are controlled by the controller installed in the control unit, so that a certain amount of the grain of coffee and the grains is selected and is supplied to the rotary drum 12. In the state that the support of the rotary drum 12 is inserted into the rotation members, the heated air inlet 15 having the net 16 is arranged with the heated air flow path 4.

In this state, the temperature and revolution are controlled by controlling the temperature controller 22 and the revolution controller 23 based on the tastes and roasting state of the grains, and the driving motor 19 is driven. The worm gear 20 is rotated based on the driving operation of the driving motor 19. The rotation members are rotated based on the rotation of the ring gear 18 for thereby rotating the rotary drum 12. The rotary drum 12 is rotated in a twisting state by the supports which are supported eccentrically at both ends. When the rotary drum 12 is rotated, the air heated by the heater 5 is supplied into the rotary drum 12 through the heated air flow path 4 by the blower 3. The grain of coffee or grains are roasted by the heated air. The peels of the grains which are generated during the roasting operation are discharged through the peel collecting port 6 through the discharging port 7, and the roasted grains are moved to the outside by separating the rotary drum 12.

The rotation of the ring gear engaged with the worm gear 20 of the driving motor 19 installed at a lower portion of the body 1 is limited by the clutch elastic unit 21 installed at an end portion of the worm gear 20. When the rotation of the rotary drum 12 is stopped in a state that an end portion of the worm gear 20 is engaged with the ring gear 18, the worm gear 20 is separated from the ring gear 18. In the separated state, the rotary drum 12 is moved to the position in which the rotary drum 12 is separated from the rotation members by the weight center of the rotation drum 12. In this state, the roasted grains are discharged or the grains are newly provided. In a state that the rotary drum 12 in which the grains are newly supplied is engaged, when the driving motor is re-driven, the elastic unit 21 is operated, and the worm gear 20 and the ring gear 18 are engaged for thereby roasting the grains.

As described above, in the present invention, since the rotary drum 12 is rotated in the twisting state, it is possible to uniformly roast the grain of coffee and grains supplied in the rotary drum 12, and the peels of the grains are outputted to the outside during the roasting operation. The temperature of the roasting state is controlled during the roasting operation by the heated air, so that it is possible to control the roasting degree based on the taste and perfumes. In addition, it is possible to implement an effective supply and discharge of the grains, and it is possible to implement a quick and proper taste roasting operation with respect to a lot amount of the grains.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A grain roasting apparatus in which a blower is installed at one side of a body having a support at a lower portion of the same, a heated air flow path is installed in the blower, a heater is provided, a peel collecting port and a discharge port are installed at the other side of the body, rotation portions are installed in an upper portion of the heated air flow path and an upper portion of the discharging port, respectively, a rotary drum is installed in the rotation portions, rotation members are rotated together with the rotary drum, the rotary drum is inserted into the rotation members, the rotary drum is installed eccentrically about a rotation center, support portions are installed opposite each other at both ends of the same, a heated air flow port having a net and connected with the heated air flow path is protruded from one side of the support, the heated air flow port is inserted into an insertion portion of the rotary member, and is supported therein, a ring gear is installed in an outer portion of the rotation member, and the ring gear is engaged with a worm gear of the driving motor installed in a lower portion of the body for thereby roasting the grains of coffee and grains in a state that the rotary drum is in a twisting state.

2. The apparatus of claim 1, wherein a clutch elastic means is provided at an end portion of the work gear for thereby controlling a rotation of the ring gear, and the rotation drum is rotated in a twisting state for thereby roasting the grains.

3. The apparatus of claim 1, wherein a temperature controller and a revolution controller are installed in the heater and driving motor, respectively, and are controlled by a controller installed in a control unit for thereby controlling a roasting degree of the grains in the rotary drum.

* * * * *